UNITED STATES PATENT OFFICE.

CHRISTIAN G. FRASH, OF NEW YORK, N. Y.

IMPROVEMENT IN PREPARING CORKS FOR STOPPERS.

Specification forming part of Letters Patent No. 167,521, dated September 7, 1875; application filed February 24, 1875.

*To all whom it may concern:*

Be it known that I, CHRISTIAN G. FRASH, of the city, county, and State of New York, have invented a certain new and useful Improvement in Preparing Cork for Stoppers, of which the following is a specification:

This invention consists in treating cork with albumen in such a manner that when such prepared cork is worked into stoppers these stoppers are soft, elastic, and impermeable to carbonic acid and other gaseous bodies and liquids.

In carrying out my invention I first prepare the cork in the usual manner, and then I cut the same up into stoppers of the required shape. These stoppers I introduce into a vessel which is hermetically closed, and which connects with an air-pump, and also with another vessel containing a solution of albumen.

By means of the air-pump I exhaust the air from the vessel containing the cork-stoppers, and then I open the communication with the vessel containing the albumen, so that the stoppers become thoroughly impregnated with the solution of albumen, all the pores and cells of the corks being filled with this material. The solution is then drawn off, and steam, superheated steam, or hot-air is introduced in the same vessel, or other convenient vessels, in order to coagulate the said albumen, and make it insoluble, and to dry the corks, and have them ready for immediate use or storage.

After the cork-stoppers have been impregnated with albumen and exposed to the action of steam or heated air, they may be further treated with a solution of tannin or other astringent material for the purpose of increasing the insolubility of the albumen.

By this mode of treatment the stoppers are made durable, soft, and elastic, so that they can be easily forced into the bottles.

These stoppers I use particularly for bottles containing champagne or other effervescent liquids, and said corks are impermeable to the liquids or gases contained in the bottles for which they are to be used, and bottles containing effervescent liquids can be stopped effectually.

What I claim as new, and desire to secure by Letters Patent, is—

1. A cork-stopper, impregnated with albumen.

2. The process of treating cork-stoppers by first impregnating them with albumen, and then exposing the same to the action of steam or heated air, substantially as set forth.

In testimony that I claim the foregoing I have hereunto set my hand this 20th day of February, 1875.

CHRISTIAN G. FRASH.

Witnesses:
W. HAUFF,
E. F. KASTENHUBER.